July 24, 1956  W. D. SHOBERG  2,755,727
VENTILATOR
Filed April 6, 1953
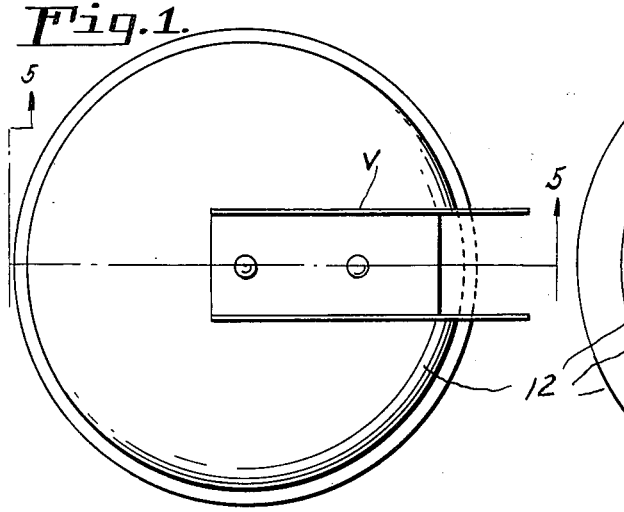
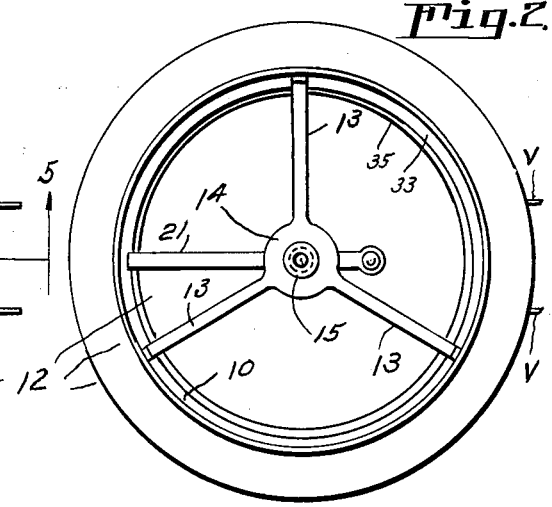
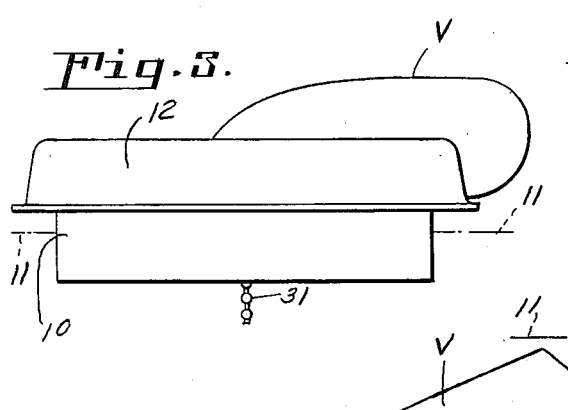
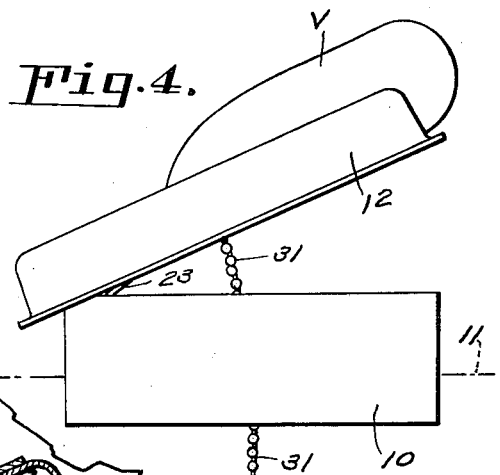
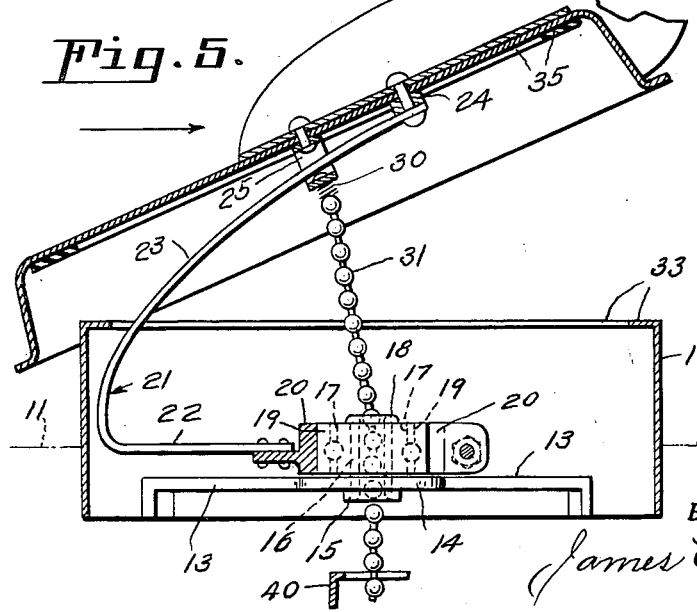
INVENTOR.
Wayne D. Shoberg.
BY
James C. Hamilton, ATTY

United States Patent Office 2,755,727
Patented July 24, 1956

2,755,727

VENTILATOR

Wayne D. Shoberg, Fort Bragg, Calif.

Application April 6, 1953, Serial No. 347,107

2 Claims. (Cl. 98—19)

My present invention relates to ventilators and more particularly to a free-floating ventilator bonnet member which turns with the wind and is air and water tight when closed.

The principal object of my invention is to produce an improved ventilator.

Another object is to produce an improved ventilator having a universally movable and resiliently supported bonnet free to rotate with means for closing and locking in a lowered position with air and water tight closure means to the interior of any structure with which it may be used.

A still further object is to produce an improved ventilator having a raised top bonnet portion normally positioned at an angle to a horizontal plane when in operation, and Other objects and novel features comprising the construction and operation of the ventilator will be more apparent as the description of the same progresses.

In the drawings illustrating the preferred embodiment of the invention:

Fig. 1 is a top plan view of the ventilator in a closed position;

Fig. 2 is a bottom plan view of the ventilator in a closed position.

Fig. 3 is a side elevation of the ventilator in a closed position, the opposite side being a duplicate thereof, portions of which are cut off for convenience.

Fig. 4 is a side elevation of the ventilator in an open position, the far side being a duplicate thereof, portions of which are shown in elevation, and other portions of which have been cut off for convenience, and Fig. 5 is a cross-section taken on the line 5—5 of Fig. 1, other portions of which are cut off for convenience.

Referring more in detail to the drawings, 10 indicates a cylindrical base member which may be mounted in the roof of a trailer 11 or other structure to which it may be attached. At V is indicated a vane member which is attached to the top of the bonnet 12. In the base portion 10 is mounted a three-legged web-form supporting member 13, the central portion 14 of which provides a fixed tubular member 15 the body portion 16 of which is passed tightly through the inner annulus, or race 17 of a ball bearing. The upper end of the tubular member 15 is rounded over at 18. At 19 is indicated the outer annulus, or race of the ball bearing assembly around which is securely clamped the split ring 20. When the ring 20 is clamped on the outer ball-race or annulus portion 19 a clearance space between the bottom face of the ring 20 and the upper side of supporting portion 14 is maintained so that the ring 20 fixed to the race member 19 is capable of spinning freely around the inner race member 17 which is fixed to the supporting portion 14.

Attached to the ring portion 20 is a special flat spring member 21 having a normal horizontal portion 22 and an upper curved portion 23 the upper end of which is secured to the under side of the bonnet 12 being spaced therefrom by the spacer 24. The upper portion 23 of the spring 21 passes through a guide member 25 also secured to the bonnet 12 and at a point approximating the center of said bonnet. The indicated rivets hold the guide member and rear portion of the vane portion V on the bonnet, and another rivet serves a similar purpose between the forward end of the vane V and the upper end of spring 23. Any other means of securing these parts together may be used, as desired.

Attached to the bottom side of the guide member 25 is a tension spring 30, and to the spring 30 is attached a ball-socket chain 31, the lower end of which passes down through the tubular member 15.

In operation, the bonnet assumes a normal, angular, raised position, as shown in Fig. 5 when in use, and the bonnet 12 rotates on the ball bearing very easily with the slightest motion of the air passing the ventilator being influenced by the vane member V. The arrow, in Fig. 5 indicates the direction of air flow.

As will be noted no part of the bonnet 12 contacts any stationary portion of the ventilator, excepting through the ball bearing 21. The bonnet is free to rotate in any direction the air may be influencing it.

When it is desired to close the ventilator, the ball chain 31 is pulled down lowering the bonnet 12. On the top rim of the base portion 10 is provided an annular flange portion 33 which engages an annular gasket portion 35 on the bonnet. The bonnet 12 is pulled down firmly, engaging the gasket 35 against the flange portion 33. After the seating of the bonnet gasket 35 on the flange, still further downward pressure is applied to the chain placing a tension on the spring 30. The lower portion of the ball chain may now be engaged in a forked bracket such as shown at 40 which is fixed to a permanent lower structure, as the interior of a trailer, or any other anchor means may be substituted for the member 40 to hold the chain 31 down under spring tension.

When the ventilator is closed the tightly seated gasket 35 makes an air and water tight seal so that no air can pass in or out of the ventilator and no water driven by heavy winds can be driven through it and down into the trailer or other compartment under the ventilator.

While I have shown my invention somewhat in detail yet it is to be understood that I may vary the size and proportions and use equivalent structure within wide latitude without departing from the spirit of the appended claims.

Having thus described my invention what I claim as new is:

1. An improved ventilator for an automobile trailer roof or the like and comprising a tubular mounting member adapted to be mounted in and projected through a trailer roof, a spider member having arms fixed to the lower portion of said mounting member, said spider member providing a central seat concentric with said mounting member, a ball bearing incorporating assembly including inner and outer ball bearing confining annuli, means securing said inner annulus to said spider seat, an inverted pan like bonnet providing a base and a depending endless flange, said bonnet adapted to nest upon said mounting member with its flange surrounding the upper portion of the latter, a generally L-form support of flat spring metal and providing a horizontal lower portion secured to and rotatable with the outer annulus of said ball bearing assembly, the upper end of said L-form support rising above the plane of said mounting member and curved toward the plane of the center thereof, means substantially tangentially securing a flat face of the upper inwardly inclined end of said L-form support to the bonnet base short of the center thereof, whereby to rock the major area of said bonnet away from said mounting member, weather vane-like means located on said bonnet for controlling the position of the latter with respect to wind direction, and means for closing and retaining said bonnet base against said mounting member against the action of said L-form bonnet support.

2. The structure of claim 1 and the means for securing said inner ball bearing-confining annulus to said spider seat comprising a sleeve anchored to said annulus and seat and extending through the latter, an anchoring means and said bonnet closing and retaining means including a flexible connection secured to said bonnet and extending through said sleeve for engagement with said anchoring means.

References Cited in the file of this patent

UNITED STATES PATENTS

| | | |
|---|---|---|
| 230,952 | Mark | Aug. 10, 1880 |
| 964,177 | Newman | July 12, 1910 |
| 1,218,164 | Bicalky | Mar. 6, 1917 |
| 2,211,367 | Davey et al. | Aug. 13, 1940 |

FOREIGN PATENTS

| | | |
|---|---|---|
| 523,672 | Great Britain | July 19, 1940 |